US00RE38561E1

(19) United States
(12) Reissued Patent
Keesmann et al.

(10) Patent Number: US RE38,561 E
(45) Date of Reissued Patent: Aug. 3, 2004

(54) FIELD EMISSION CATHODE

(75) Inventors: Till Keesmann, Bahnhofstrasse 53 a, 69115 Heidelberg (DE); Hubert Grosse-Wilde, Neunkirchen (DE)

(73) Assignee: Till Keesmann (DE)

( * ) Notice: This patent is subject to a terminal disclaimer.

(21) Appl. No.: 10/408,871

(22) PCT Filed: Feb. 22, 1995

(86) PCT No.: PCT/DE95/00221

§ 371 (c)(1),
(2), (4) Date: Aug. 23, 1996

(87) PCT Pub. No.: WO95/23434

PCT Pub. Date: Aug. 21, 1995

Related U.S. Patent Documents

Reissue of:
(64) Patent No.: 5,773,921
Issued: Jun. 30, 1998
Appl. No.: 08/702,684
Filed: Aug. 23, 1996

(63) Continuation of application No. 09/504,635, filed on Feb. 15, 2000, now Pat. No. Re. 38,223.

(51) Int. Cl.[7] ..... H01J 1/02
(52) U.S. Cl. ..... 313/309; 313/336; 313/351; 313/495
(58) Field of Search ..... 313/309, 336, 313/351, 495, 496, 497

(56) References Cited

U.S. PATENT DOCUMENTS 5,089,742 A * 2/1992 Kirkpatrick et al. ..... 313/351
5,138,220 A * 8/1992 Kirkpatrick ..... 313/309
5,449,970 A * 9/1995 Kumar et al. ..... 313/495
5,495,143 A * 2/1996 Lengyel et al. ..... 313/574

OTHER PUBLICATIONS

Ajayan et al., *Nature*, 361;333–334, Jan. 1993.*
Kirkpatrick et al., *Applied Physics Letters*, 60:1556–1558, Mar. 1992.*
Lin et al., *Physical Review*, 47:7546–7553, Mar. 1993.*
Saito et al., *Materials Science and Engineering*, B19:185–191, 1993. (no month).*
*IBM Technical Disclosure Bulletin*, 35:410–411, Dec. 1992.*
Iijima, Helical microtubules of graphitic carbon, *Nature*, 354 (Nov. 7, 1991), pp. 56–58.*
Iijima et al., Single–shell carbon nanotubes of 1–nm diameter, *Nature*, 363 (Jun. 17, 1993), pp. 603–605.*
Iijima, Growth of carbon nanotubes, *Materials Science and Engineering*, (1993), pp. 172–180.*
Jose–Yacaman et al., Catalytic growth of carbon microtubules with fullerence structure, *Applied Physics Letters 62*, No. 6 (Feb. 8, 1993), pp. 657–659.*
Ge et al., Vapor—Condensation Generation and STM Analysis of Fullerence Tubes, *Science* 260 (Apr. 23, 1993, pp. 515–518.*
Kosakovskaya et al., Nanofilament carbon structure, *JETP Letters*, 56 (Jul.–Dec. 1992), pp. 26–30.*
Knife–edge thin field emission cathodes on (110) silicon wafers. pp. 644–647, by elliott et al, Jul. 1993.*

* cited by examiner

*Primary Examiner*—Ashok Patel
*Assistant Examiner*—Kevin Quarterman
(74) *Attorney, Agent, or Firm*—Kelly K. Kordzik; Winstead Sechrest & Minick P.C.

(57) ABSTRACT

A field emission cathode device consisting of an electrically conducting material and with a narrow, rod-shaped geometry or a knife edge, to achieve a high amplification of the electric field strength is characterized in that the electron-emitting part of the field emission cathode at least partly has preferred cylindrical host molecules and/or compounds with host compounds and/or cylindrical atomic networks, possibly with end caps with diameters measuring in the nanometer range.

14 Claims, 3 Drawing Sheets

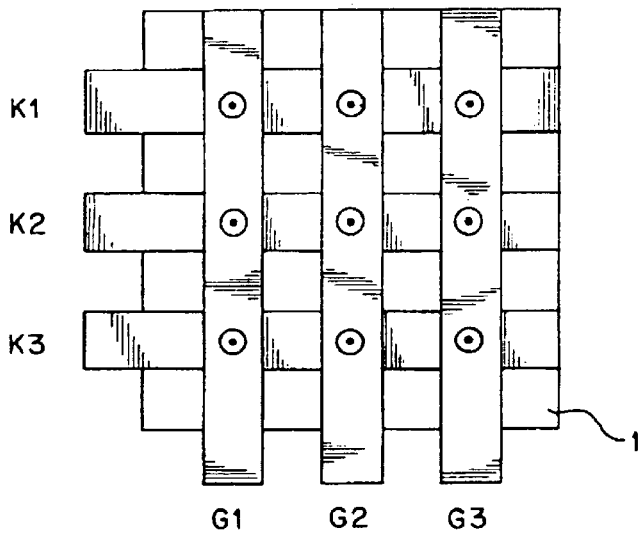
FIG. 5
FIG. 7
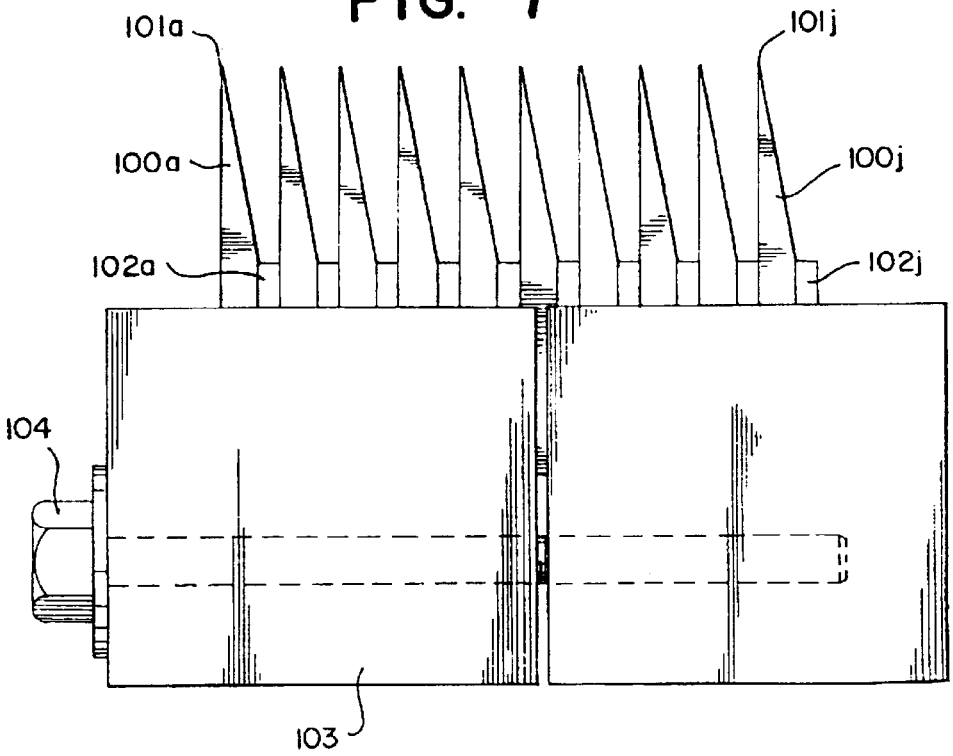

FIELD EMISSION CATHODE

Matter enclosed in heavy brackets [ ] appears in the original patent but forms no part of this reissue specification; matter printed in italics indicates the additions made by reissue.

*CROSS REFERENCE TO RELATED APPLICATIONS*

*This application is a continuation of U.S. patent application Ser. No. 09/504,635, issued as U.S. Reissued Pat. No. RE38,223, which is a reissue of U.S. Pat. No. 5,773,921, which is a 371 of PCT/DE95/00221, filed Feb. 22, 1995.*

The invention relates to a field emission cathode device of an electrically conducting material and with a narrow, rod-shaped geometry or a knife edge to achieve high amplification of the electric field strength, such that the electron-emitting part of the field emission cathode has cylindrical molecules. The invention also relates to a method for producing such a field emission cathode device.

Field emission means the emission of electrons from the surface of an electric conductor under the action of an electric field exceeding $10_9$ V/m. In practice, such field strengths are realized at sharp edges or tips, where the field strength is amplified. High vacuum is necessary to avoid gas discharges.

DESCRIPTION OF THE PRIOR ART

Field emission cathodes are used, for example, in field electron microscopes, in electron accelerators, in high-power switches (OS DE 39 24 745 A1) and in field emission diodes and field emitter arrays for vacuum microelectronics (thus for example Busta, Vacuum microelectronics—1992, Journal of Micromechanics and Microengineering, 2 (1992), pp. 53–60, and Iannazzo, A survey of the present status of vacuum microelectronics, Solid State Electronics, 36 (1993), pp. 301 to 320). A tungsten wire can be used as the field emission cathode, whose tip becomes so fine by etching that it can no longer be seen in an optical microscope. Also by etching, the ends of carbon fibers can be made sufficiently fine (Heinrich, Essig, Geiger, Appl. Phys. (1977) 12, pp. 197–202) to serve as a field emission cathode.

In vacuum microelectronics, field emission cathodes generally are produced by the methods of microprocess technology, by etching and sputtering, using lithographically produced masks (see Busta, Vacuum microelectronics—1992, Journal of Micromechanics and Microengineering, 2 (1992), pp. 53–60). By this method, one can produce conical tips with a radius of curvature of a few nm or wedge-shaped cutting edges with comparable radii of curvature. As materials for the cathode, one can use, for example, molybdenum, lanthanum hexaboride, hafnium, diamond-like carbon (B. C. Djubua, N. N. Chubun, Emission properties of Spindt-type cold cathodes with different emission cone material, IEEE Transactions on Electron Devices, 38 (1991) No. 10, pp. 2314–2316).

A disadvantage in the use of tips and edges, which have been produced by the known methods, is that the electron stream declines with operating time, since the tips or edges are destroyed by the positive ions of the unavoidable residual gas in the system. The like applies to field emission cathodes which are produced by sputtering techniques. The reason for this primarily is that the material structure of the emission tips is not uniquely defined. Thus, the geometry and microstructure of the tip and thus the work function of the electrons can vary within such wide limits that the electron streams from several tips, which were produced in one process, can differ by orders of magnitude, and furthermore change with operating time.

Furthermore, field emission cathodes for vacuum microelectronics cannot be produced in their optimal geometry by the prior art. Field strength calculations for various geometries of the tips show that the best shape of a field emission cathode is a narrow rod (Utsumi, Vacuum microelectronics: What's new and exciting, IEEE Transactions on Electron Devices 38 (1991), pp. 2276–2283). The present methods of microstructure technology can produce at most wedge-shaped tips in a defined manner.

Carbon nano-cylinders were observed for the first time in an electron microscope by Iijima (Nature, 354 (1991), p. 56). They can now be produced in large quantities, for example at the cathode of a visible arc (Iijima, Materials Science and Engineering, B19 (1993), pp. 172–180). In the presence of iron or cobalt, one can produce single-shell carbon nano-cylinders. Theoretical calculations show that, depending on the helicity of the hexagonal ring structure, the walls of the carbon nano-cylinders are electrically conducting or semiconducting (Saito, Fujita, Dresselhaus, Dresselhaus, Materials Science and Engineering, B19 (1993), pp. 185–191). The carbon nano-cylinders can also be filled with metals, for example with lead. Other methods for producing carbon nano-cylinders are described in the literature:

Carbon nano-cylinders can be produced by the catalytic decomposition of acetylene through iron particles at about 700° C. (Jose-Yacaman, Miki-Yoshida, Rendon, Applied Physics Letters 62 (6) 1993, pp. 657–659).

In the presence of methane, argon, and iron vapor, single-shell carbon nano-cylinders can be found in the carbon deposit on the chamber walls of a visible arc apparatus (Iijima, Nature 363 (1993), pp. 603–605).

By sputtering a carbon film in high vacuum, multiple-shell carbon nano-cylinders can be deposited on a graphite surface (Ge, Sattler, Science 260 (1993), pp. 515–518).

By sputtering ultra-pure graphite with electron beams in vacuum, carbon nano-cylinders can be produced on substrates consisting of various materials, such that the carbon nano-cylinders are aligned in the direction of the vapor jet (Kosakovskaya et al., JETP Lett., 56 (1992), p. 26).

In addition to the carbon nano-cylinders, disordered carbon particles generally are also deposited on the substrate. These can be removed, for example, by treatment in an oxidizing atmosphere at an elevated temperature up to 500° C., preferably 400° C. The carbon nano-cylinders at the end caps can be opened in a similar manner in an oxidizing atmosphere (air, $CO_2$, or pure oxygen). This offers the possibility of filling the carbon nano-cylinders with metals, as described for a filling with lead by Ajayan and Iijima in Nature 361, p. 333.

In principle, it is possible to fasten these carbon nano-cylinders, produced by one of the above methods, on a suitable substrate, by means of micro-manipulators, and thus to produce a field emission cathode. However, this method is impractical, and in particular is not suited for field electron arrays with many cathode tips, as is desired in vacuum microelectronics.

Field emission cathodes with emission tips of biomolecular microstructures or a metal-semiconductor-eutectic are known from the U.S. Pat No. 5,138,220. The diameter of these structures measures in the micrometer range, and subsequent metallization is necessary to achieve adequate emission.

The publication IBM Technical Disclosure Bulletin, Vol. 35, No. 7, December 1992, pp. 410–411 describes the use of Buckminster fullerene molecules as the tip of scanning-probe microscopes. Besides spherical $C_{60}$ molecules, derivatives of $C_{60}$ - and hetero-fullerenes are mentioned, that is host molecules in which individual C-atoms have been substituted by boron or nitrogen.

BRIEF SUMMARY OF THE INVENTION

The present invention is based on the object or on the technical problem of specifying a field emission cathode which avoids the disadvantages of the prior art, assures high emission quality, makes possible a longer lifetime, and in particular resists bombardment with residual gas ions. Furthermore, the present invention is based on the object or on the technical problem of specifying a method for producing a field emission cathode of the type mentioned in the introduction, so as to assure technically optimal manufacture together with economy.

The inventive field emission cathode device consists of an electrically conducting material and having the shape of a narrow rod or a knife edge to achieve high magnification of the electric field strength, such that the electron emitting part of the field emission cathode has cylindrical molecules, wherein the cylindrical molecules are formed at least in part as single-shell or multiple-shell carbon nano-cylinders. The inventive method for producing the field emission cathode device with carbon non-cylinders which have been expanded during the gas phase. Advantageous modifications and developments are the subject of the subclaims.

An especially preferred design of the inventive field emission cathode is characterized in that carbon nano-cylinders are used as field emission cathodes. Single-shell carbon nano-cylinders with a diameter of about 1 nanometer and a length greater than 1 micrometer, or also multiple-shell ones with a diameter up to several nanometers can be produced. Bundles of single-shell carbon nano-cylinders with diameters of about 5 nanometers can also be produced. The walls of the carbon nano-cylinders consist of carbon atoms in a hexagonal pattern, while the end caps additionally contain 5-ring structures. The individual carbon atoms of the carbon nano-cylinders are strongly bound chemically, as a result of which the carbon nano-cylinders have extremely great mechanical strength. This also results in their high sputtering strength in comparison to randomly grown tips, which are sputtered according to the prior art.

Using well-known carbon nano-cylinders as a field emission cathode thus combines the advantage of optimal geometry with high strength, thus assuring that the emission properties of such field emission cathodes will not change during their operation, in contrast to previously used cathode tips.

So that the above advantages of the carbon nano-cylinders can also be used for making the field emission cathode arrays of vacuum microelectronics, the known methods for producing such arrays must be modified according to the invention, in such a way that the carbon nano-cylinders grow on appropriately prepared locations of a substrate.

The production method can be used to produce either individual field emission cathodes or also field emission cathode arrays.

Further embodiments and advantages of the invention derive from the other characteristics cited in the claims, and from the embodiments given below. The characteristics of the inventions can be combined with one another in arbitrary fashion, unless they obviously exclude one another.

BRIEF DESCRIPTION OF THE DRAWINGS

The invention as well as advantageous embodiments and developments thereof are described and elucidated in more detail below in terms of the examples shown in the drawings. The features contained in the description and in the drawings can be used inventively individually by themselves or in various combinations.

FIG. 5 shows a section of a field emitter array with individually actuatable emission tips.

FIG. 7 shows in cross section a prepared block of ten graphite wafers with a clamping fixture for sputtering carbon nano-cylinders.

DETAILED DESCRIPTION OF THE INVENTION

Below it will be explained, by way of an example, how field emission cathodes of carbon nano-cylinders can be produced, such as can be used, for example, as cathodes for diodes or switches. By way of a second example, it will be explained how field emission cathodes for a field emitter array can be produced by the methods of microstructure technology.

Example: Production of individual cathodes on a knife edge

Figure 6:
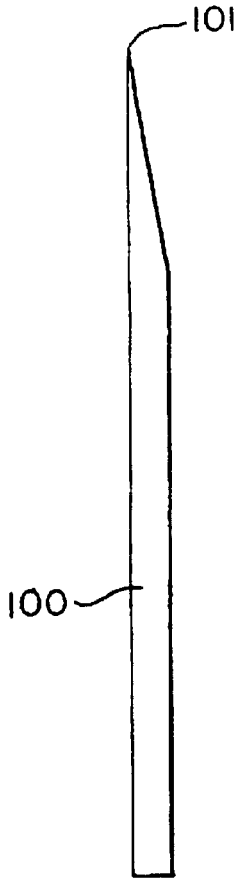
FIG. 6 shows the cross section of a graphite wafer with a knife edge.

Square graphite wafers about 1 cm (centimeter) on a side, and 1 mm (millimeter) thick are ground or etched to a knife edge on one side. FIG. 6 shows such a graphite wafer 100 with a knife edge 101, beveled on one side. FIG. 7 shows how ten of these graphite wafers 100a to 100j are collected together into a block in a clamping fixture 103, in such a way that the knife edges 101a to 101j on one side of the block lie in one plane and an aluminum foil or Teflon foil is situated between each of the graphite wafers as a spacer 102a to 102j. The clamping fixture consists of two brass blocks, into which recesses have been milled to receive the ten graphite wafers with their spacer foils. These blocks are screwed together by two screws 104.

The prepared block is installed in a vacuum apparatus, in which a target of ultra-pure graphite is sputtered with an electron beam. The graphite target and the block are arranged here in such a way that the carbon vapor strikes the plane of the graphite knife edges perpendicularly. Under these conditions, carbon nano-cylinders grow on the knife edges individually and in bundles of several cylinders, in the direction of the carbon vapor beam. When a layer several tenths of a micrometer thick has been reached, the sputtering process is terminated.

The knife edges and the beveled surfaces of the graphite wafers are now coated with carbon nano-cylinders, which have extremely high mechanical strength. The microstructure of the surface is characterized by cylindrical elevations with sharp tips which have a radius of curvature of a few nanometers.

Figure 8:
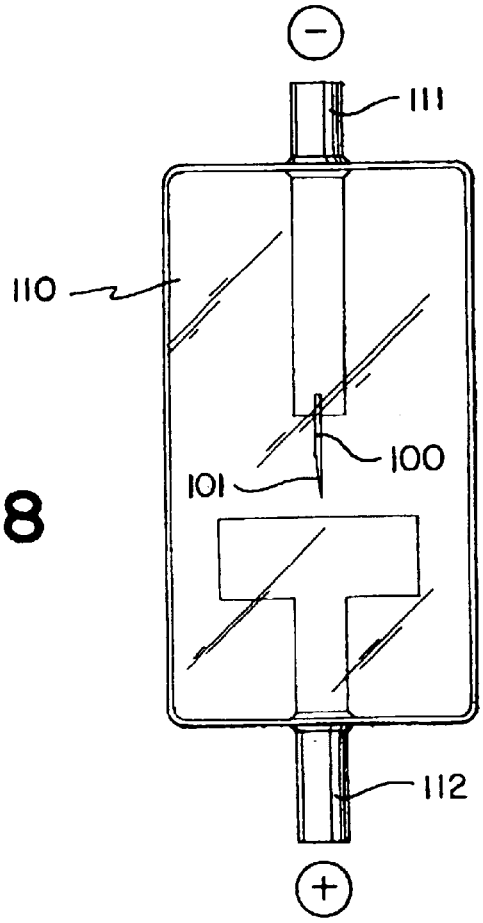
FIG. 8 shows a diode for the power pulse technique with an inventively prepared field emission cathode.

FIG. 8 shows how a graphite wafer prepared in this manner can be used in a diode that operates as a switching element. An anode 112 with a large surface and a cathode pin 111 are fused in an evacuated glass flask 110. The graphite wafer 100 with its knife edge 101 is fastened on the cathode pin in such a way that it is situated opposite the anode at a distance of about 1 mm. If a sufficiently high negative voltage is applied to the cathode, an electrical current can flow through the diode.

In the same manner, several knife edges instead of a single knife edge can be used as a cathode.

These knife edges are characterized in that, in contrast to knife edges without carbon nano-cylinders, they amplify the electric field much more. A consequence of this is that, given the same voltage, the field emission current is much greater. Furthermore, the emission tips are not already destroyed after a brief operating time by the ions of the residual gas.

The production method described above can easily be transferred to a rather large number of graphite wafers with longer knife edges. Also, the edge angle and the spacing between the knife edges can be varied within broad limits. This therefore represents a field emission cathode whose electron-emitting surface and current density can be adapted to many applications, for example in power pulse technology.

Example: Production of field emission cathodes as an array

Figure 1:
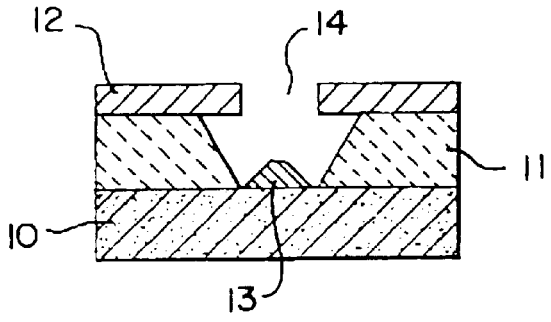
FIG. 1 shows an individual field emission element of a field emitter array, such as can be produced by the prior art.

First, an array of field emitter cathodes and gate electrodes of molybdenum will be produced on a doped silicon substrate, in accordance with a previously known method, and specifically by the methods of silicon processing technology, as is described, for example, in the article, Spindt et al., J. Appl. Physics 47 (1976), p. 5248ff (see also Busta loc. cit. and Iannazzo loc. cit.). FIG. 1 shows a field emitter cathode with a gate electrode. Reference No. 10 designates the electrically conducting, n-doped silicon substrate, 11 designates a sputtered insulating layer about 2 $\mu$m thick and consisting of $SiO_2$. Reference No. 12 designates the sputtered molybdenum gate electrode, about 0.5 $\mu$m thick. Reference No. 13 designates the tip-shaped field emission cathode of molybdenum. The gate openings 14 of the molybdenum layer are preferably chosen to lie between 0.4 and 0.8 $\mu$m. By means of the above-cited production method, one thus achieves the result that the cathode cone tips lie about 0.5 $\mu$m below the gate electrodes.

Figure 2:
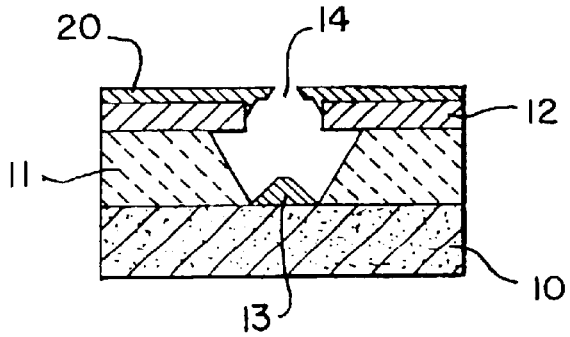
FIG. 2 shows the same element in accordance with the first inventive process step, so as to provide the emission tip with carbon nano-cylinders.

In a following process step, a sacrificial layer of aluminum is applied to the field emitter array which, in this form, already corresponds to the prior art. This is done by rotating the substrate perpendicular to the surface and sputtering it with aluminum at slant incidence. This type of sputtering prevents the aluminum from depositing in the cathode openings. FIG. 2 shows a field emitter element produced in accordance with this process step; the aluminum sacrificial layer is designated by 20.

Figure 3:
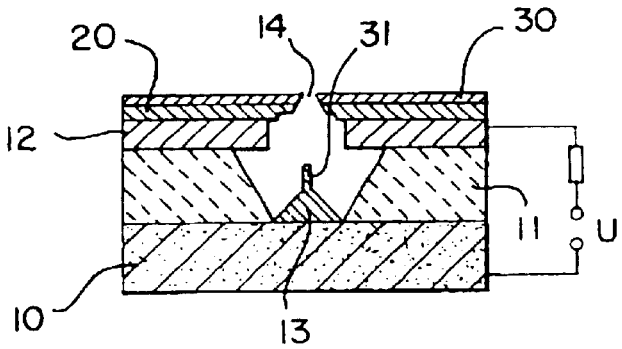
FIG. 3 shows the same element after carbon has been sputtered.

In a subsequent process step, the graphite target disposed above the field emitter array is sputtered by an electron beam, and the carbon is deposited on the field emitter array. A portion of the carbon atomic beam penetrates through the gate opening and deposits on the cathode tips. As is known from a publication by Kosakovskaya et al., JETP Lett., 56 (1992) 26, cylindrical, parallel graphite fibers thus form in the direction of the incident atomic beam. The growth process is improved if, during this process step, a voltage $U_G$ of the order of 50 V is applied between the cathode and gate layer. The average field strength is then of the order of 50 V/0.5 $\mu$m–$10^8$ V/m; because the field strength is amplified at the tip, it there rises to over about $10^9$ V/m. The high field strength at the fiber tip evidently causes the fiber ends to remain open and improves the growth of the fibers (Smalley, loc. cit. p. 4). FIG. 3 shows a field emitter element made in accordance with this process step. Here, 30 designates the deposited carbon layer on the gate electrode, and 31 designates one or more carbon nano-cylinders on the molybdenum tip. The voltage source to create the field strength at the cathode tip is also shown schematically.

The growth of the carbon nano-cylinders can be controlled through the emission current Ic. The longer the grown carbon nano-cylinders, the stronger becomes the emission current. The process must be terminated at the proper time, when the carbon nano-cylinders have reached a length of several tenths of a $\mu$m. It is here advantageous to modulate the gate voltage $U_G$ slightly. The quotient $dIc/dU_G$ is designated as the differential slope and can be used as a measure of the quality of the field emitter array.

Figure 4:
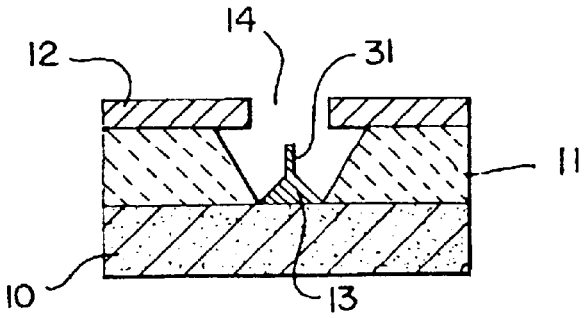
FIG. 4 shows the same element after the last process step, in its final state.

In a last step, the carbon layer with the aluminum sacrificial layer is etched off, so that, after this step, the field emitter element looks as shown in FIG. 4.

In a modification of the production process described above, instead of producing the cathodes so as to be electrically connected in their totality and lying at the same potential, they can also be produced in such a way that only one row of them is electrically coupled together. In the same manner, the gate electrodes can be produced in such a way that only one row of them is electrically coupled together, although perpendicular to the direction of the row of cathodes that are connected together. This then offers the possibility of driving each cathode individually. This type of circuit is already known and is used, for example, for a screen with digitally actuatable image points, from LETI Company (described in Busta loc. cit., pp. 69–70). This circuit, for the case of three rows of cathodes and three rows of gates, is shown schematically, in a top view, in FIG. 5. Electrically conducting cathode tracks K1, K2, and K3, for example consisting of n-doped silicon, are applied on a substrate with an electrically non-conducting surface 1, along a width of a few micrometers. The following insulating layer of silicon dioxide (not shown), about 2 micrometers thick, corresponds to the arrangement described by Spindt. The gate electrodes G1, G2, and G3 are applied in strips just like the cathodes, but perpendicular to the direction of the cathode tracks. The further process steps correspond to the steps used to produce the field emitter cathodes that cannot be individually actuated.

The center electrode of the last column in FIG. 5 can now be driven in such a way, for example, that a negative voltage is applied to the cathode strips K2 and a negative voltage is applied to the gate strips G3; a field emission current will then flow from this electrode, which can be measured in the cathode or gate circuit or which can be detected by a suction anode, which is not shown here.

In the production method described here, this arrangement of the cathode strips and gate strips can be used to control specifically the production process of each individual cathode. It is then possible to measure the emission current from each field emitter tip during the production process, and not merely the total amount from the entire field emitter array. By turning off the voltage at one field emission cathode, one can favor the formation of an end cap with 5-ring structures, so that no further growth will occur.

It is advantageous for the formation of carbon nano-cylinders to form them at elevated temperatures of 100° to 700° C. (degrees Celsius), preferably 300–400° C.

It is also advantageous to apply a layer of iron or cobalt, a few atomic layers thick, on the molybdenum cathode tips before sputtering on the carbon. The iron and cobalt evidently have a positive catalytic effect on the formation of carbon nano-cylinders.

As a modification of the invention, one can also dispense with the advantage of the narrow, cylindrical shape of the carbon nano-cylinders and utilize only the advantage of the high mechanical stability of host molecules, that is their resistance to the bombardment of the cathode by positive residual gas ions. In this case, cathodes produced conventionally—by sputtering in vacuum by the methods of microstructure technology or by etching, are coated with electrically conducting host molecules. The host molecules can be fullerenes, hetero-fullerenes, or their derivatives, especially also endohedral or exohedral compounds, for example of the type $M_3C_{60}$ or $M_3C_{70}$, where M designates a metal, preferably the alkali metals potassium or sodium. The host molecules can also be applied to the cathode in crystalline form, for example $C_{60}$ in the form of fullerite.

The field emission cathodes, whose resistivity and emission properties have been improved by coating them with carbon nano-cylinders or also with fullerenes and their derivatives, in molecular or crystalline form, can be used wherever thermionic cathodes in vacuum were used previously, and in all applications of vacuum microelectronics. Typical fields of application will be listed below, without this listing being exhaustive, and a person skilled in the art can easily transfer the inventive field emission cathode to similar applications.

Single emitter tips, emitter edges, or emitter arrays can be used as electron sources for X-ray tubes, X-ray tubes with planar, drivable cathodes, for example for computer tomography, electron beam lithography, miniature electron microscopes, power switching tubes, diodes or triodes, logic circuit elements, video screens.

Field emission cathodes can be used in miniaturized electronic components, such as ultra-high frequency diodes, ultra-high frequency triodes, diodes and triodes in combination with semiconductor components, temperature-stable diodes and triodes in the engines of motor vehicles, temperature-stable logic components, electronic components with diode and triode functions, which are particularly resistant to electromagnetic interference and ionizing radiation, pressure sensors, in which the cathode gate distance is influenced by the pressure, microwave generators and amplifiers.

As arrays, field emission cathodes can be used preferably as electron sources with a large surface, yielding a high current density, drivable electron sources for planar video screens with a high light density in monochromatic or color designs.

What is claimed:

[1. A field emission cathode which consists of an electrically conducting material having the shape of a narrow rod or a knife edge to achieve high magnification of the electric field strength, such that the electron-emitting part of the field emission cathode has cylindrical molecules formed at least in part as single-shell or multiple-shell carbon nano-cylinders.]

[2. The device of claim 1, wherein the carbon nano-cylinders have end caps.]

[3. The device of claim 1, wherein the single- or multiple-shell carbon nano-cylinders are collected into bundles.]

[4. The device of claim 1, wherein the carbon nano-cylinders are filled with metal.]

[5. The device of claim 1, wherein the carbon nano-cylinders at least partly have endohedral or exohedral compounds with other atoms or molecules.]

[6. The device of claim 1, wherein the field emission cathode forms the tip of a field electron microscope, a field ion microscope, a scanning tunnel microscope, or a scanning power microscope.]

[7. The device of claim 1, wherein a plurality of similar field emission cathodes is disposed in a line or a plane, and thereby forms a linear or planar electron source.]

[8. The device of claim 1, wherein a plurality of similar field emission cathodes is disposed in a plane in the form of a matrix, and the field emission cathodes can be driven individually, and the field emission cathodes represent the electron sources for the image points of a visual display system.]

[9. The device of claim 8, wherein the plurality of similar field emission cathodes is in the range of 10,000 to 100,000 molecules.]

*10. A field emission cathode comprising an electron-emitting part of the cathode formed at least in part as a carbon nano-cylinder.*

*11. The field emission cathode of claim 10, wherein the carbon nano-cylinder is single-walled.*

*12. The field emission cathode of claim 10, wherein the carbon nano-cylinder has an end cap.*

*13. The field emission cathode of claim 10, wherein the carbon nano-cylinder is filled with metal.*

*14. The field emission cathode of claim 10, wherein the carbon nano-cylinder is multi-walled.*

*15. A field emission apparatus comprising:*

*a substrate;*

*a carbon nanotube deposited over the substrate; and*

*an electrode operable for creating an electric field in order to promote an emission of electrons from the carbon nanotube.*

*16. The field emission apparatus of claim 15, wherein the electrode includes a gate electrode positioned a first distance from said substrate.*

*17. The field emission apparatus of claim 15, wherein the electrode includes a conducting material deposited over the substrate.*

*18. The field emission apparatus of claim 15, wherein the carbon nanotube comprises a single-walled carbon nanotube.*

*19. The field emission cathode of claim 15, wherein the carbon nanotube comprises a multi-walled carbon nano-cylinder.*

*20. The field emission cathode of claim 15, wherein the carbon nanotube comprises a carbon nanotube having two walls.*

*21. The field emission apparatus of claim 15, further comprising an anode positioned a distance from the substrate.*

*22. The field emission cathode of claim 15, wherein the electrode includes a conducting material deposited over the substrate.*

*23. A field emission apparatus, comprising:*

*a substrate; and*

*one or more electron emitter structures comprising a carbon nano-cylinder deposited on a growth surface over the substrate, wherein the carbon nano-cylinder is grown catalytically in situ on the growth surface from a carbon-containing precursor material.*

* * * * *